April 23, 1957 D. W. GILLINGS 2,789,765
APPARATUS FOR COUNTING AND MEASURING PARTICLES
Filed April 23, 1951 4 Sheets-Sheet 1
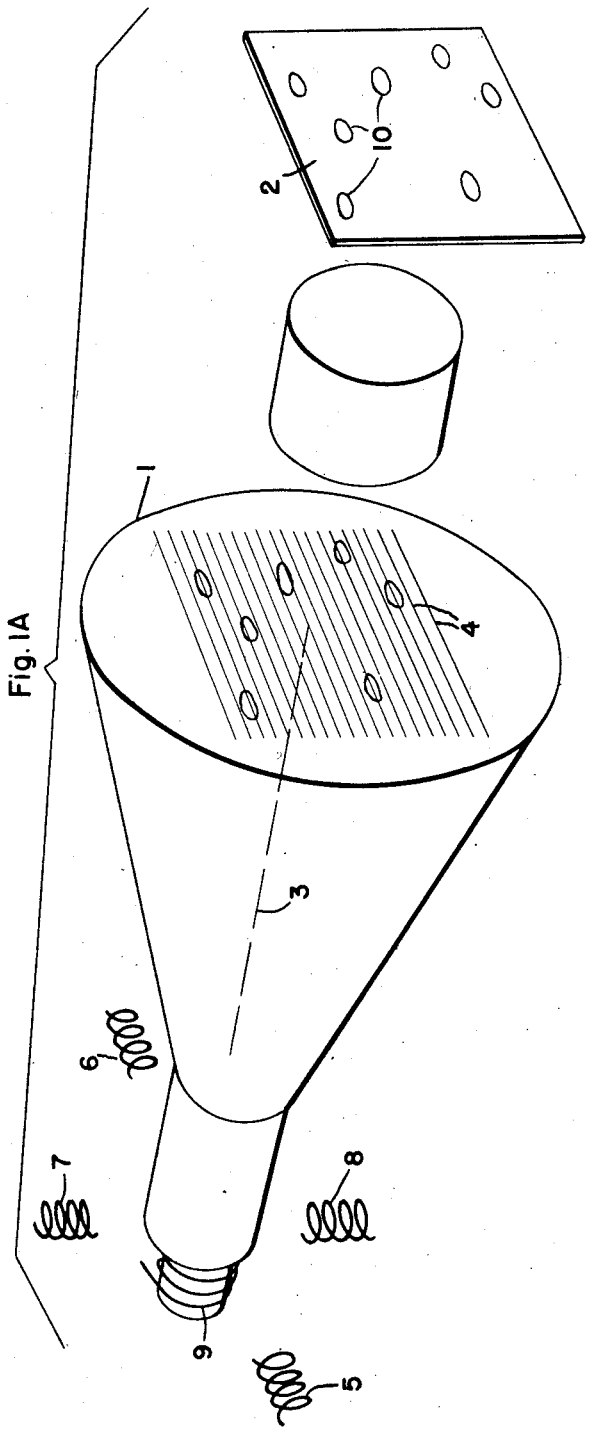
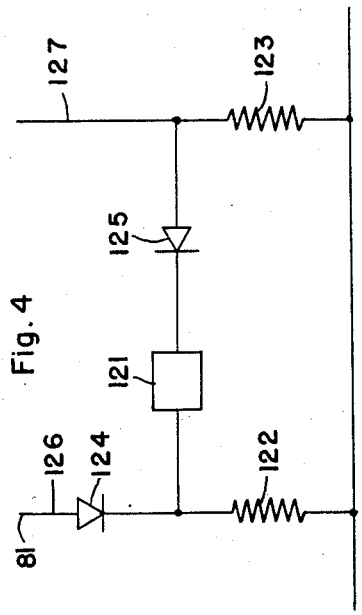

April 23, 1957   D. W. GILLINGS   2,789,765
APPARATUS FOR COUNTING AND MEASURING PARTICLES
Filed April 23, 1951   4 Sheets-Sheet 3

April 23, 1957 D. W. GILLINGS 2,789,765
APPARATUS FOR COUNTING AND MEASURING PARTICLES
Filed April 23, 1951 4 Sheets-Sheet 4

United States Patent Office 2,789,765
Patented Apr. 23, 1957

2,789,765

APPARATUS FOR COUNTING AND MEASURING PARTICLES

David William Gillings, Cheltenham, England, assignor to National Coal Board, London, England, a corporation of Great Britain Application April 23, 1951, Serial No. 222,430

Claims priority, application Great Britain May 4, 1950

19 Claims. (Cl. 235—92)

This invention relates to apparatus for determining the number and/or size or distribution of sizes of particles, fragments, stains, traces, small patches or the like (hereinafter referred to as elements) in a collection, group, cluster, assembly or the like (hereinafter referred to as a collection) thereof.

Such determinations are, for example, of importance in investigations of dust clouds by the method in which samples of the particles in such clouds are settled on a collecting surface and the collected particles are then counted and their sizes determined.

Visually counting and examining such elements is a long and laborious task and it is an object of the invention to provide an apparatus for determining automatically and rapidly the total number and/or the numbers of elements of various size groups in a collection thereof.

Accordingly the invention provides apparatus for obtaining information relating to the number and/or size of elements in a sample of non-uniform irregularly distributed elements comprising means for producing a beam of energy, means for scanning the elements of the sample by said beam, thermionic valve means for detecting electric signals created as said beam traverses each element, further thermionic valve means for grouping together all the signals associated with one and the same element, and counting means actuated by said further thermionic valve means to provide counts of the said signals.

The beam may be caused to traverse each relatively larger element a greater number of times than the said beam is caused to traverse each relatively smaller element, and the dimension of the beam in a direction transverse to the direction of scanning is preferably not greater than the smallest dimension of any element in the said transverse direction.

In order to obtain a count of reasonable accuracy it is essential that the elements shall not mask one another from the scanning beam and consequently the elements are arranged lying spaced apart in a single layer on a supporting surface.

The elements themselves, or a photograph of the collection, may be scanned directly by a light beam or an optical image of the elements may be formed on a suitable screen which is scanned by an electron beam to produce the signals in a manner similar to that employed in some television cameras.

If an element is small enough to lie wholly within one of the scanning lines then that element will give rise to only one signal. However, if an element is larger and projects into two or more scanning lines then a signal will be produced when the beam encounters that element in each of these scanning lines and consequently two or more signals will be produced in respect of that one element. Unless steps are taken to make allowance for that effect the count will be inaccurate in that the larger elements will be counted two or more times. It is, therefore, another object of the invention to provide counting apparatus which allows for this and it is a further object of the invention to utilise the multiplicity of signals obtained from larger elements in a succession of traverses of the scanning beam to count the number of elements having a size within a given range of sizes. The intervals between the two or more signals produced in respect of an element which projects into two or more scanning lines may be determined by the time taken for the scanning beam to travel from a given point on one line to the immediately adjacent point on the next successive line, subject to small variations due to the particular shape of the element.

Preferably the scanned area is of rectangular shape, the scanning being a linear scan the path of the scanning beam being along lines which are substantially parallel to one side of the rectangle, and the beam is moved at a constant speed along the said lines, scanning may, however, be of a spiral pattern. It will be readily appreciated that we use the word "scanning" to mean the repeated traversing of the scanned area. In this arrangement the intervals between successive signals from any one element are made substantially equal and are the same for an element at any position in the scanned area, each such interval being substantially equal to the time taken to scan each line (including the "fly-back" time if appreciable). Consequently those successive signals which follow one another at intervals equal to the line-scan time are identified as being in respect of one and the same element. The number of signals in any such succession is thus related to the size of that element.

The apparatus may further comprise means for forming a scanning beam the dimension of which in a direction transverse to the direction of scanning is not greater than the smallest dimension of any element in the said transverse direction.

The apparatus may still further comprise means for counting the number of signals produced while eliminating from the total count all but one of any sequence of signals in which each signal in the sequence is caused by one and the same relatively larger element, thereby counting the number of elements which intercept more than one scanning line.

Conveniently the signals in such a sequence of signals will be arranged to follow one another with a time interval between successive signals equal to the line scan time. The number of signals in such a sequence can be used for sizing the element associated with that sequence.

The electrical counting system may comprise; a multiplicity of signal registering channels all arranged to receive the signals from the scanning means and arranged so that at any instant only one of the channels is operative to register such a signal and on receipt of the signal the operative channel becomes inoperative to register a further signal but renders another channel operative; means for rendering the channel which has become inoperative as aforesaid, or each such channel in turn, again the operative channel after a time interval (the "engaged interval") equal to or only slightly less than the line scanning period (i. e. the time taken to scan one line, including the "fly-back" time if appreciable) from the time at which it registered the signal so that the channel will immediately register, and be rendered inoperative by, a signal from the same unit if it projects into or across the line then being scanned; and means for counting each time the channel is rendered inoperative after an engaged interval without immediately receiving another signal.

The number of channels used must be not less than the maximum number of elements present in any scanned line. The latter number may be adjusted by varying the length of the scanned line or one or more spare channels may be incorporated for use when necessary. The determination and selection of the maximum number of elements is related to the number and use of spare channels, the provision of which permits a check of the estimate of the maximum number of elements to be counted in one line. If the spare channel is switched in the total count will be unaltered, provided that the number of channels exceeds the maximum number of elements in a line, so that in practice check counts would be made with varying numbers of channels estimated to be in excess of the minimum.

The signal registering channels may comprise a multiplicity of electronic valves, one for each channel, connected in a counting ring circuit, e. g. with a common cathode load and with the anode of each valve connected by a high impedance D. C. conducting path to the control electrode of each of the other valves so that only one of the valves can be conductive at any instant and with selective circuits provided for determining which of the non-conductive valves shall become conductive when the conductive valve is rendered non-conductive.

An electronic switch may be provided respectively for each of the valves in the ring for operation to prevent the selective circuits from rendering the valve conductive during the said engaged interval. The electronic switch is preferably arranged, on operation, to connect the selective circuits to the electronic switch of another valve in the ring throughout the engaged interval so that that other valve is rendered conductive, providing that it also is not "engaged."

A flip-flop circuit may be provided respectively for each of the valves in the ring. Each flip-flop is preferably arranged to be supplied with a pulse when a signal is registered by its associated valve in the ring and, as a consequence of receiving that pulse, to apply an initiating pulse to that valve to render it conductive at the end of the engaged interval. Each flip-flop is also preferably arranged to apply to the electronic switch associated with it a long pulse lasting for the duration of the engaged interval to operate the electronic switch as aforesaid, circuits to couple the flip-flop and electronic switch being so designed that no influence is exerted on the output circuit of the electronic switch by the pulses generated to control it according to the position of the flip-flop.

The means for counting each time a channel is rendered operative after an engaged interval without immediately registering another signal may comprise a uniselector switch or equivalent device which may be connected to the flip-flop and arranged to be stepped-on by one contact each time the flip-flop emits a pulse at the end of an engaged interval.

The uniselector is also preferably arranged to receive a pulse from the flip-flop whenever the associated valve in the ring receives a signal, and circuits are preferably associated with the uniselector so that whenever the pulse from the flip-flop which steps the uniselector on is not followed immediately by a pulse indicating that the valve in the ring has received another signal, then the uniselector transmits a pulse through the contact on which its wiper rests and then "homes." Corresponding contacts on the respective uniselectors are preferably connected together and to one of a multiplicity of simple pulse counters, each of the simple pulse counters thus registering the total number of units within a limited size range.

By way of example one embodiment of the invention will now be described with reference to the accompanying drawings in which:

Figure 1A is a diagrammatic showing of the scanning apparatus and typical raster;

Figure 4 is a diagram of a balanced circuit which is employed with a simple counter for rendering that counter inoperative when two pulses arrive together but operative to count a pulse which arrives unaccompanied.

Figure 1:
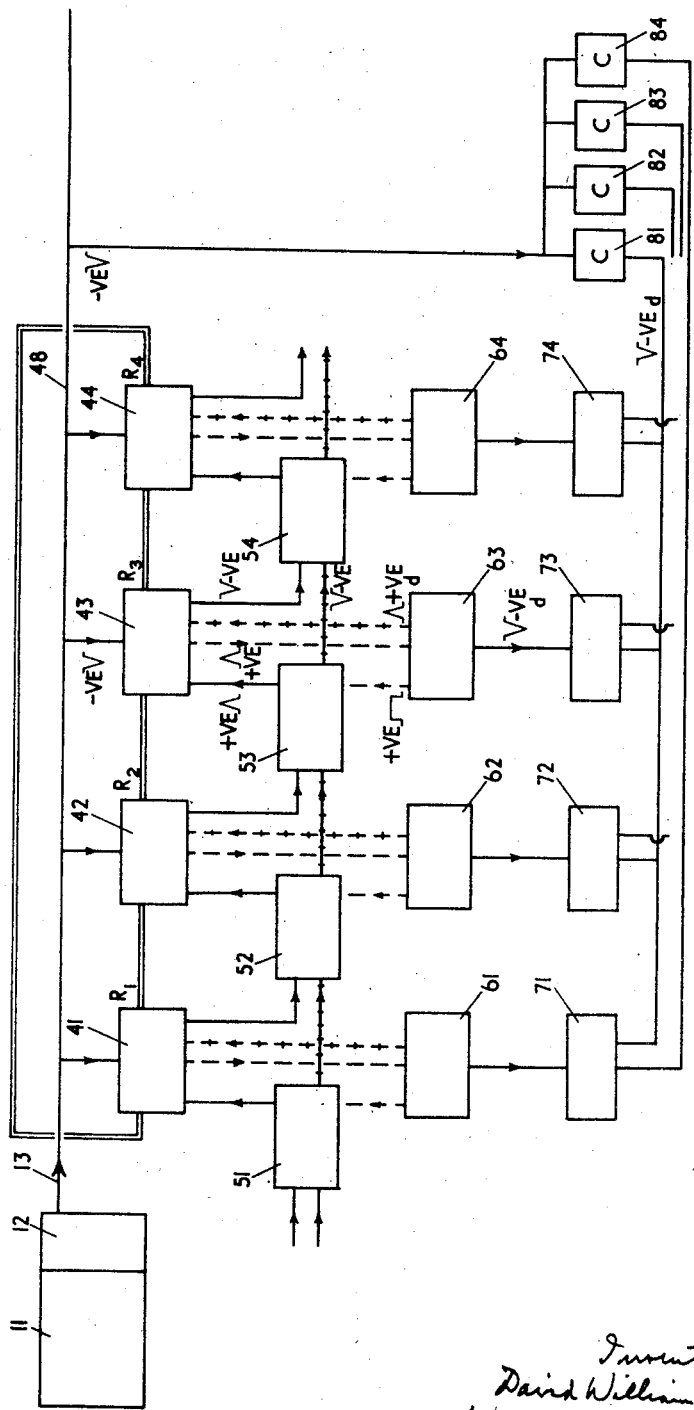
Figure 1 is a schematic diagram of the electrical counting system.

In this example the apparatus is employed in connection with counting particles of coal dust which are settled on to a glass cover slip, about ¾ inch in diameter, by means of a thermal precipitator in a known manner. The dust particles may be of sizes from about 20 microns or greater down to ½ micron or less. It is usually desired to count the number of particles having a size within various ranges e. g. 1–5 microns or ½ to 5 microns and it is sometimes desired to count the number of particles lying within each of a number of more precise size ranges, e. g. less than ½, ½–1, 1–2½, 2½–5, 5–10 and greater than 10 microns. The cover slips carrying the dust particles are often mounted on standard microscope slides and are attached to the slides by a ring of melted wax applied around their edges, the dust particles lying between the cover slip and the slide. Usually most of the particles remain as a layer on the surface of the slip but some of them may fall on to the surface of the slide to form a second layer spaced from the first.

In this example the scanning may be carried out by a beam of light. The scanning beam may be directed through the cover slip and slide on to a photoelectric cell which provides an electrical pulse each time the beam is obscured or partly obscured by one of the particles. Alternatively photomicrographs of the layer or layers of particles may be prepared (e. g. with a magnification of 100 or 1000) and these photomicrographs may be scanned with a beam of light in conjunction with a photoelectric cell. The photomicrographs are preferably negative transparencies so that the photographic images of the particles permit the scanning beam to pass through them to the photoelectric cell, thereby producing a series of pulses. The photomicrographs may alternatively be of an opaque or translucent nature and a photoelectric cell may be arranged to receive light which is reflected therefrom during the scanning.

Preferably a photomicrograph 2 of the particles 10 as shown in Figure 1A is focused on the screen 1 of a conventional television camera 11 in which the image on the screen 1 is scanned by an electron beam 3. (In a modification of this arrangement images of the particles themselves may be focused on to the screen by the use of a suitable microscope projection system.) The screen 1 is scanned over a rectangular area in known manner by deflecting electron beam 3 under the influence of varying magnetic fields produced in known manner by coils 5, 6 and 7, 8 and the scanning lines form a raster 4 in which they lie substantially parallel to one side of the rectangle. The rectangular area is completely scanned only once and is not repeatedly scanned as in a television arrangement. In order to avoid second order errors the velocity of the beam should be constant. The width of the scanning beam 3 is controlled in known manner by a focusing coil 9.

The pulses produced by the television camera 11 or the photoelectric cell are amplified in a conventional electronic amplifier 12 and are then fed to the signal input terminal 13 of a counting ring circuit through a cathode follower circuit.

Figure 2:
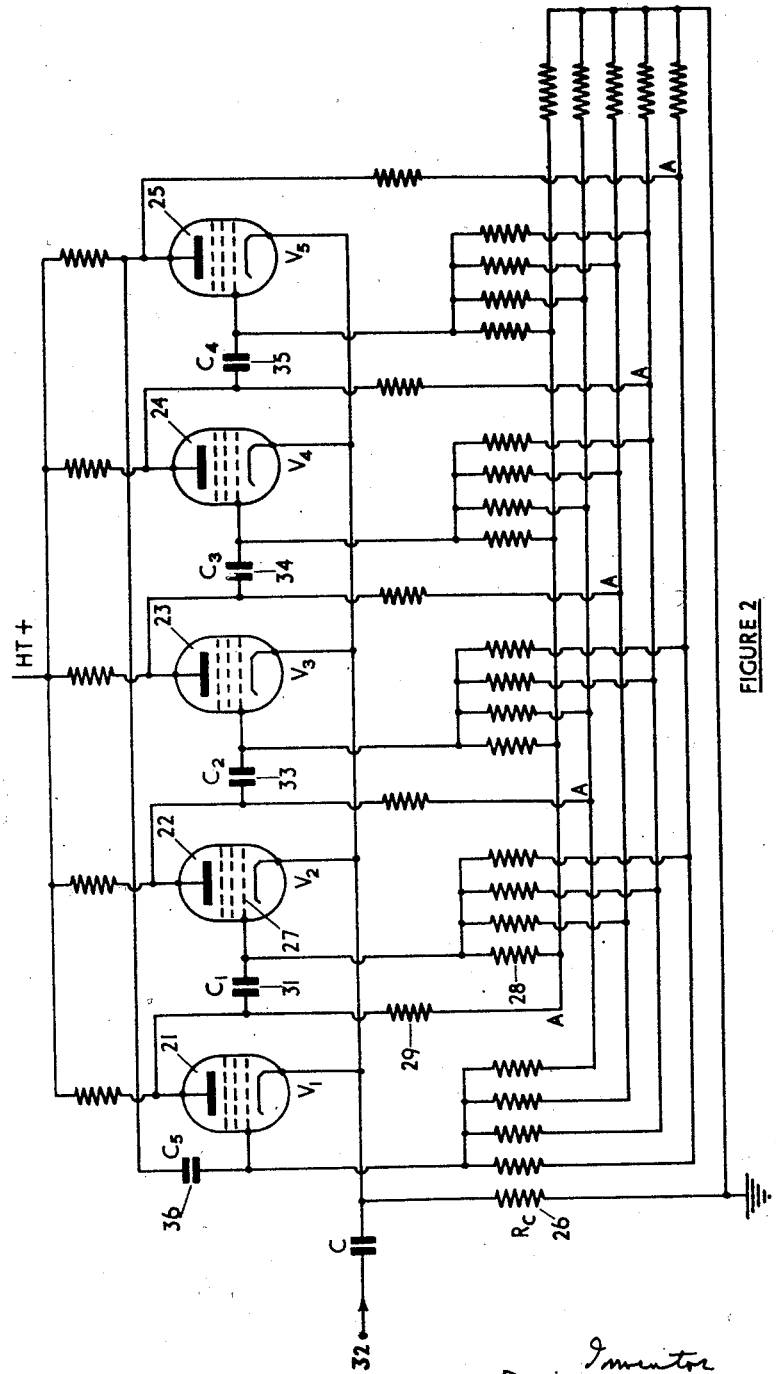
Figure 2 is a circuit diagram of a counting ring circuit which is incorporated with modifications in the electrical counting system.

A well-known form of counting ring circuit is shown in Figure 2 and comprises a multiplicity of substantially identical electronic valves (in Figure 2 five valves are shown for example) 21, 22, 23, 24, 25. These valves have control grids and in the example shown they are pentodes. The valves 21, 22, 23, 24, 25, have a common cathode load resistor 26. The control grid of each valve is connected by a high resistance D. C. conducting path to the anode of each of the other valves. For example the control grid 27 of valve 22 is connected through resistors 28 and 29 to the anode of valve 21. In addition, the control grid of each valve is connected by an additional or selective coupling, which is nonconducting to D. C., to the anode of only one of the other valves. For example the control grid 27 of valve 22 is connected through a capacitor 31 to the anode of valve 21. At any instant, one and only one of the valves (say valve 21) passes current. If a negative signal of appropriate amplitude and duration is applied to the control grids of the valves in the ring circuit (e. g. by applying a suitable positive pulse to the input terminal 32) only valve 21 is affected. Its anode voltage rises and consequently the cathode voltage of all the valves falls. The rise in anode voltage of valve 21 is transferred in part to the grids of all the other valves by the D. C. couplings and, selectively, by the capacitor 31, to the grid of valve 22. The result is that the anode current of valve 22 rises, and the time constants of the various coupling circuits are so chosen that the ring circuit then takes up a fresh stable state in which only valve 22 passes current. Valve 22 is then the valve in the ring which is sensitive to any appropriate signal applied to the input terminal 32.

In the electrical counting system employed in the present embodiment of the invention four input channels 41, 42, 43, and 44 are employed each comprising a valve all connected in a counting ring circuit substantially as shown in Figure 2 except that the selective coupling is effected by electronic switches 51, 52, 53, 54 as hereinafter described instead of by the capacitors 31, 33, 34, 35, 36 shown in Figure 2. The earth connection is also modified so that the ring circuit operates on the application of negative pulses to its input terminal 13. Each input channel valve also has a pulse generator and a uniselector switch associated with it. The pulse generators are designated 61, 62, 63, 64 and the uniselectors 71, 72, 73, 74.

On receipt of a negative pulse from the amplifier 12 the one input channel valve which is conductive (say valve 43A of channel 43) immediately sends a positive pulse to the pulse generator 63 associated with it, and also immediately sends a negative pulse to the electronic switch 54 associated with the next valve 44 in the ring. The pulse generator 63 commences to generate a single positive pulse signal. The main characteristic of this pulse is a transient voltage of constant amplitude, and duration about 0.005 of the line scan time, timed to occur at the end of an interval equal to about 0.98 of the line-scan time after receipt of the positive pulse from the valve 43A. The delayed positive pulse is applied to the control grid of the valve 43A and causes that valve to become the conductive valve in the ring, irrespective of which other valve had been the conductive valve immediately prior to the generation of the delayed pulse.

A controlling signal is also generated by the pulse generator 63 to control the electronic switch 53. The function of the controlling signal is to operate the electronic switch 53 to prevent the valve 43A from becoming the conductive valve in the ring within an interval (the engaged interval) equal to about 0.98 of the line-scan time after being rendered non-conducting by a negative pulse from the amplifier 12. The controlling signal is a single "square" pulse of duration equal to about 0.98 of the line-scan time.

The electronic switch 53 is one of four interconnected similar electronic switches whose function is to select as the input channel for any signal from the amplifier 12, in respect of a particle which is encountered by the scanning beam for the first time, the next unengaged input channel valve i. e., the next input channel valve in the ring sequence which is not "awaiting" for the successor to a signal received less than the line-scan time previously. An electronic switch (say 53) either receives a negative pulse from the previous input channel 42 containing valve (42A) when that valve is rendered nonconducting, or if corresponding valve say 41A (not shown) in channel 41 is rendered nonconductive while channel 42 is engaged then the negative pulse from channel 41 is passed through electronic switch 52 to electronic switch 53. The electronic switch 53 then either (i) sends a positive pulse to the grid of the valve 43A if it is not engaged or (ii) passes a negative pulse to electronic switch 54 if valve 43A is engaged. Each electronic switch is controlled by the controlling signals generated by its associated pulse generator as previously described. The interconnected electronic switches, it will be appreciated, provide channels which enable scanning signals received in respect of "new" particles to by-pass those input channel valves which have to be held free and in readiness to receive possible sequences of signals resulting from the scanning of large particles.

A simple pulse counter of well known type is provided for each size group, and these simple counters are shown at 81, 82, 83, 84. The counter is of well known type wherein an electro-magnet is energised by an electrical pulse which causes an armature to approach the core of the electromagnet, the armature being mounted so that its movement actuates a cyclometer dial by advancing the cyclometer reading by one unit for each energising pulse. Corresponding contacts on the uniselectors 71, 72, 73, 74 are connected together and to a balanced circuit, as shown in Figure 4 associated with one of the simple counters 81, 82, 83, 84. The wiper of each uniselector is arranged to be fed with a negative pulse by the pulse generator associated with it, each time that pulse generator supplies a positive pulse to its associated input channel valve. The balanced circuits of the simple counters are also supplied with the negative pulses received from the amplifier 12. Each particular simple counter only adds unity to its total count when it receives a negative pulse from a uniselector unaccompanied by a negative pulse from the amplifier 12. The wiper of each uniselector is stepped on by one contact each time its associated pulse generator supplies a positive pulse to its associated input channel valve, and the wiper of each uniselector is "homed" i. e. returned to its zero position after a "holding" positive pulse is generated by the pulse generator without being immediately followed by receipt of a negative pulse from the amplifier 12 and subsequent generation of another "holding" pulse. Consequently each simple counter counts the number of particles lying within one size range. The total number of particles irrespective of size may be counted by supplying all the signals which are normally supplied via the uniselector wipers to a balanced circuit associated with a single simple counter and also supplying that balanced circuit with all of the signals from the amplifier 12.

The number of particles within one size range is indicated by the appropriate pulse counter because the final signal in any sequence of signals will move the arm of the uniselector for the channel engaged by that signal to a contact which transmits signals onward from the uniselector and is appropriate to the number of signals already grouped in a sequence from the scanning of one element, and thus characterising the size of that element. Thus all uniselectors have a corresponding contact for each of the signals from elements of any one size, and the grouping of these contacts to feed one pulse counter ensures that all signals from elements of the same size are counted together to give a total of elements of this size only and thus yield data from which size analysis is derived directly.

In Figure 1 the shapes of the pulses transmitted along the various paths are indicated diagrammatically in the channel associated with input channel 43. The paths which pass negative pulses from the input channel valves to the pulse generators are indicated in broken lines. The paths which pass the delayed positive pulses from the pulse generators to the input channel valves are indicated in broken lines having short cross-bars. The paths taken by the pulses by-passes by the electronic switches when one or more of the input channel valves is engaged are shown by full lines having short cross-bars.

Figure 3:
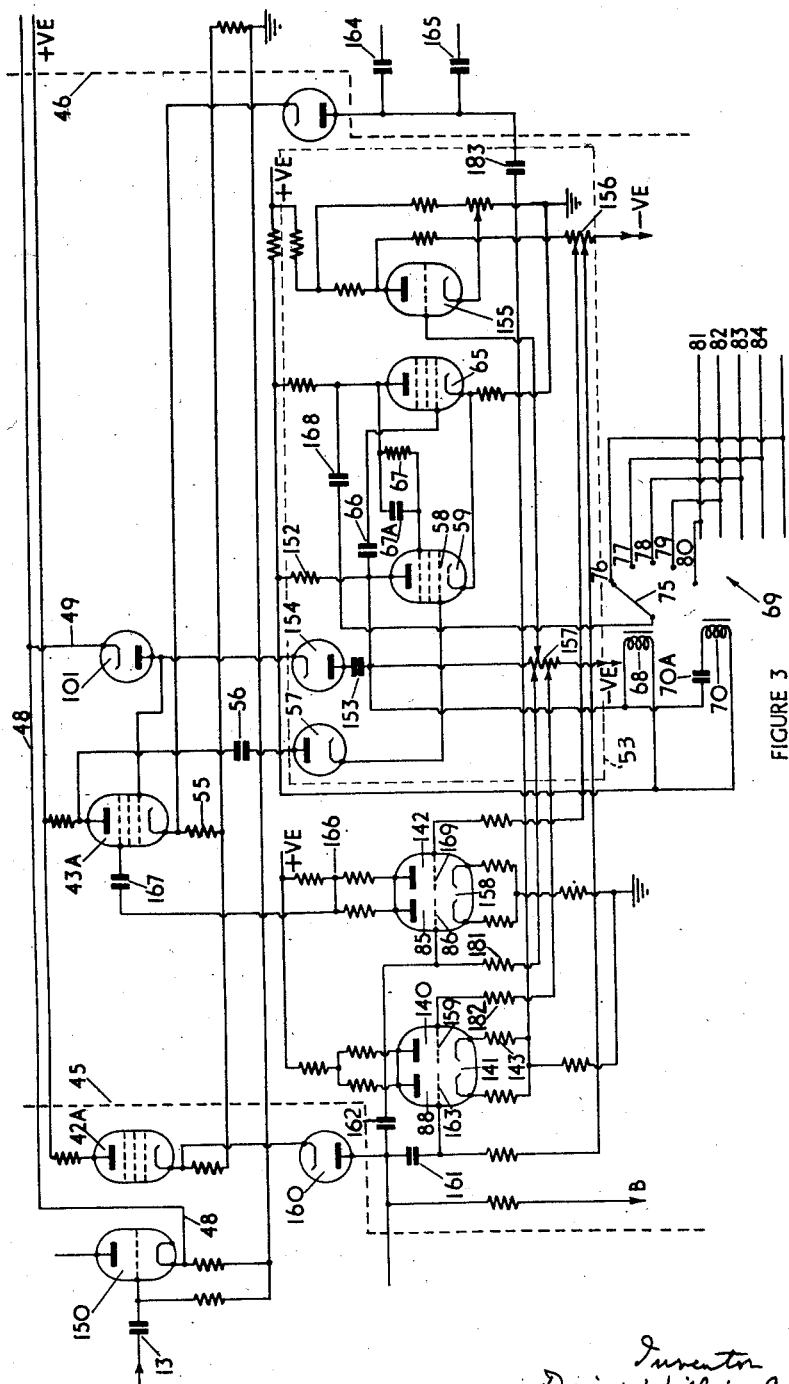
Figure 3 is a circuit diagram of part of the electrical counting system, showing in detail one signal registering channel with its associated circuits.

In Figure 3 the circuit of one of the channels is shown in greater detail between the dotted lines 45 and 46. This channel is the one containing valve 43A but all of the other channels are identical with it. Parts of the neighbouring channels are also shown to indicate the connections between neighbouring channels. It will be appreciated that there are additional connections between the valves 42A, 43A, 44A etc. to form a ring circuit substantially as shown in Figure 2, but these have been omitted from Figure 3 for the sake of clarity and as they are in any case outside the limits of the single channel described.

The pulse generator is provided by two multi electrode valves 59, 65 connected as a "flip-flop" trigger circuit which is used as a "pulse-broadener."

Assuming that valve 43A is the conductive valve in the ring then on receipt of a negative pulse from the amplifier 12 (Figure 1) and its cathode follower valve 150 along the conductors 48 and 49 and through the diode 101 the valve 43A ceases to pass current whereupon its anode voltage rises and the voltage across the cathode resistor 55 falls to zero. A positive pulse therefore leaves the anode of the valve 43A and that pulse is applied through capacitor 56 and diode 57 to the grid 58 of the multi-electrode valve 59 hitherto non-conductive. The trigger action of the "flip-flop" circuit ensues in known manner and the valves 59 and 65 interchange their anode currents so that valve 59 becomes conductive and valve 65 non-conductive for a time determined by the time constant of the coupling circuit comprising the capacitor 66, resistor 67 and capacitor 67A. The anode currents are then again interchanged and the change-back results in a positive pulse being supplied from the anode of valve 59 through capacitor 153 and diode 154 to a grid of valve 43A to render valve 43A conductive once again. The components must be selected for their stability and so that the whole time of operation of the circuit is equal to the time of scanning of a single line.

A signal developed across resistance 152 in the circuit of the "flip-flop" is supplied to a winding 68 of the uniselector 69. When the winding 68 is energised the uniselector is prevented from homing and its wiper 75 is permitted to be stepped on by one contact each time the winding 70 is energised. The winding 70 is connected to the anode of valve 59 across the resistance 152, through the condenser 70A and consequently is energised each time a pulse is generated at that anode when its potential drops owing to the valve 59 becoming conductive during each "engaged" period. Negative pulses from the anode of the valve 65 at the end of each "engaged" period are supplied to the wiper 75 (through capacitor 168). Consequently during each "engaged" period the wiper 75 is stepped on to the next successive one of the contacts 76, 77, 78, 79, 80 etc. and a negative pulse is supplied to that contact and thence to the appropriate one of a number of simple counters connected to grouping circuits 81, 82, 83, 84, etc. Each of the lines 81 to 84 lead to a number of identical counter circuits, one of which is set out completely in Figure 4, each line leading to an input rectifier such as shown at 126, thus grouping all signals from a selected size or size range to actuate only one counter. Suitable pulse shaping circuits may be included in the connection between the "flip-flop" circuit and the winding 68 to prevent the wiper 75 from homing before the wiper has stepped on to the appropriate contact and transmitted the pulse to it, and also to prevent the wiper 75 from homing during successive engaged periods in respect of one and the same element.

During the operation of the "flip-flop" circuit the valve 59 is alternately conductive and non-conductive. At the commencement and cessation of the engaged period its anode voltage changes and this voltage change is transferred in part through potentiometer 157 and resistance 181 to the grid 86 of one triode section 85 of a double triode valve 158 and through resistance 182 to the grid 159 of one triode section 140 of a double triode valve 141, the said double triodes being connected to constitute the electronic switch. The flow of current in triode sections 88 and 142 of the double triode valves 141 and 158 respectively is controlled by a voltage applied to grids 163 and 169 from potentiometer 156 connected in an anode coupling circuit of triode 155 which reverses the polarity or phase of voltages applied to potentiometer 157. The aforesaid triode sections 85 and 140 are then conductive when the channel including valve 43A is not engaged and the triode sections 88 and 142 are then non conductive. It will be understood that the action of the electronic switch ensues by the change of the two triode elements 88 and 142 from a non-conductive state to a conductive state and vice-versa. The operation of the electronic switch is then as follows: A negative pulse is received from the cathode of valve 42A of the adjacent channel when that channel responds to a signal from the scanning means and it is transmitted through diode 160 and capacitors 161 and 162 to the grids 163 and 86 of triode sections 88 and 85 respectively. When the channel including input valve 43A is engaged in the counting of a succession of particles, a negative pulse by-passes this channel by leaving from the point 143 in the net-work of resistance constituting the cathode circuits of twin triode 141 because only the triode section 88 and 142 are passing current and therefore only triode 88 can respond to the impulse from the electrode of valve 42A. This impulse reaches capacitor 183 and then through capacitors 164 and 165 to the appropriate grids of the electronic switch associated with the next adjacent channel. The engaged channel becomes disengaged due to a signal from the diode 154 which feeds to the grid of valve 43A and thus makes the valve 43A the conducting valve of all the input channel valves 42A, 43A, etc. When the channel including valve 43A is not enaged in the counting of signals from a larger particle current flows through triode section 85 and 140, and on receipt of the negative impulse from 42A as described above at grid 86 of triode section 85 a positive pulse leaves the point 166 in the anode circuit of the double triode 158 and this positive pulse is applied through capacitor 167 to a grid of valve 43A thereby initiating the flow of current in that valve and causing it to be responsive to the next signal received from the scanning means and its associated circuits.

If the valves comprising the electronic switch 52 (Figure 1) associated with the input channel 42 receives a negative pulse from the input channel 41 or from the electronic switch 51 while the channel 42 is enaged, then the electronic switch 52 will pass a negative pulse from the selected circuit to the grids 86, 163 of the triode valves 85, 88.

These valves will respond to that negative pulse in the same manner as if it came from the cathode of valve 42A of input channel 42.

The conventional circuits for supplying negative bias to the grids and other operating potentials to the various valves are omitted in Figure 3 for the sake of clarity as also are circuits providing the direct coupling between valves 42A, 43A etc. The leads to which the biases are supplied are terminated in arrow heads and marked "—ve", leads to balancing potentials in the grid biassing networks are marked B, and leads for anode supplies are marked "+ve".

The balanced circuit shown in association with a simple counter 121 in Figure 4 comprises two resistors 122, 123 and two rectifiers 124, 125. The conductor 127 is supplied with amplified signals from the scanning means and the conductor 126 is supplied with signals of the same polarity from all of the particular contacts on the uniselectors which correspond to one particular size of particles. The size of the particles is measured by the number of impulses which have advanced the uniselector and therefore by the number of contacts over which its arm has moved. If pulses are supplied to conductors 126 and 127 substantially simultaneously then any voltage produced across the counter 121 is insufficient to operate it. However when a pulse is supplied to conductor 127 without being accompanied by a pulse on the conductor 126 then the counter is operated to add unity to its recorded total. The receipt of a pulse from conductor 127 (which communicates with one of the grouped conductors 81 etc. Figure 3) unaccompanied by a pulse from conductor 126 signifies that the scanning beam has left the particle (or its image) and the count of traverses then ceases. Thus the particle concerned will be recorded on the counter appropriate to its size as already described.

The invention is not restricted to the details of the foregoing example. For instance the "flip-flop" circuits may be replaced by transitron circuits, and where appropriate the triodes or twin triodes may be replaced by multi electrode valves by means of which control can be exercised by independent grid control circuits. The uniselector switches may be replaced by escapement mechanisms and escapement counters may be employed as the simple counters. The scanning may be carried out in curvilinear instead of rectilinear manner but the scanning lines must always be substantially parallel in the sense that adjacent lines are substantially equally spaced or just touch along their length.

In the example described four channels are shown for use in the case when the maximum number of elements in a scanned line is four, but it is to be understood that a greater number of channels will be used for a larger number of elements per line.

Moreover it will be appreciated that the invention is also applicable to the counting of a large number of types of samples other than coal dust in the above size ranges settled on to cover slips in the manner described. Scanning operations giving rise to electric signals which can be subjected to counting and analysis by means of the invention can be carried out on samples or specimens of liquid droplets in the form of coarse or fine sprays, particulate and fragmentary dispersions including a wide range of particle sizes including the sub-sieve ranges, liquid dispersed in other liquids in the form of emulsions of various kinds, non-metallic and other inclusions such as appear on the surface of ingots of steel and other metals, and fragments and particles used as pigments and other powders.

It is also envisaged that the invention will be applicable to the case when the dimension of the scanning beam in a direction transverse to the direction of scanning is greater than the smallest dimension of any element in the said transverse direction but is of the same order of magnitude as said smallest dimension, i. e. not greater than $\sqrt{10}$ times said smallest dimension.

I claim:

1. Apparatus for obtaining information relating to the number and/or size of elements in a sample of non-uniform irregularly distributed elements comprising means for producing a beam of energy, means for scanning the element of the sample by said beam elements of greater than minimum size being scanned more than once by said beam, thermionic valve means for detecting electric signals created as said beam traverses each element, further thermionic valve means for grouping together all the signals associated with one and the same element, and counting means actuated by said further thermionic valve means to provide counts of the said signals.

2. Apparatus according to claim 1, wherein the scanning is performed by a beam so moved as to provide a linear scan.

3. Apparatus according to claim 1 further comprising means for forming a scanning beam the dimension of which is not greater than the smallest dimension, of any element, transverse to the direction of scanning.

4. Apparatus according to claim 1, in which every element larger than the dimension of the scanning beam in a direction transverse to the direction of scanning receives multiple traverses of the said beam thereby producing a sequence of signals.

5. Apparatus for obtaining information relating to the number and/or size of elements in a sample of non-uniform irregularly distributed elements comprising means for producing a beam of energy, means for scanning the element of the sample by said beam, elements of greater than minimum size being scanned more than once by said beam, thermionic valve means for detecting electric signals created as said beam traverses each element, further thermionic valve means for grouping together all the signals associated with one and the same element, counting means actuated by said further thermionic valve means to provide counts of the said signals and means for ensuring that each signal of the sequence of signals associated with one and the same element is separated from the immediately following signal of said associated signals by a regular interval of time approximately equal to the time required for the beam to travel from one position on one line of the scan to a corresponding position on the next line of the scan.

6. Apparatus as claimed in claim 5 further comprising means for counting the number of signals produced while eliminating from the count all but one signal of any sequence of signals caused by one and the same relatively larger element thereby providing a count of the total number of elements present.

7. Apparatus as claimed in claim 5 further comprising means for sizing any element receiving multiple traverses of the beam, by counting the number of said multiple traverses and to taking all identical multiple traverses so as to group all elements of the same size range.

8. Apparatus according to claim 5, further comprising a plurality of similar signal registering channels for receiving signals from the scanning means, each channel being provided with means for ensuring that at any instant only one of the channels is operating to register such a signal and that on receipt of said signal the said one channel becomes inoperative to register a further signal but another channel is rendered operative; and means for rendering again operative the said one channel which has become inoperative after a period of time such that each signal in a sequence of signals generated by the scanning of one and the same relatively larger element is always received by one and the same signal registering channel.

9. Apparatus according to claim 8, further comprising a plurality of signal registering channels for receiving signals from the scanning means each channel being provided with means for ensuring that any instant only one of the channels is operative to register such a signal and that on receipt of said signal the said one channel becomes inoperative to register a further signal but another channel is rendered operative; and means for rendering the said one channel which has become inoperative again the operative channel after a time interval (the "engaged interval") substantially equal to the line scanning period from the instant at which the said one channel received the signal so that the said one channel will receive and respond to another signal from the presence of the same element; means for registering the number of times the said one channel is rendered operative after an engaged interval and means for registering and counting the number of times the said one channel is rendered operative after an engaged interval without immediately receiving another signal caused by the scanning of the same element.

10. Apparatus according to claim 8, wherein the signal registering channels comprise a multiplicity of electronic valves, one for each channel, interconnected in a circuit so that only one of the valves can be responsive at any instant to a signal from the scanning means and each channel is provided with selective circuits which by means of selective impulses set up in those circuits couple said channel selectively to another channel and with determining means to determine whether the valve in one channel receives the selective impulses from another channel or whether these said impulses by-pass the said one channel because the said one channel is engaged.

11. Apparatus according to claim 9, wherein the multiplicity of electronic valves are interconnected in a counting ring circuit so that when a valve is rendered responsive it becomes the one conductive valve of the ring.

12. Apparatus according to claim 11, wherein the valve for each channel is provided with a flip-flop circuit, each such circuit being arranged to be supplied with a pulse when a signal is received by its associated valve and, as a consequence of receiving that pulse, to apply a pulse to that valve to render it responsive at the end of the engaged interval.

13. Apparatus according to claim 12, wherein the said determining means comprises an electronic switch for each valve in the ring to prevent said valve in the ring from becoming conductive during the said engaged interval, the electronic switch for each valve being arranged so as on operation to direct the selective impulses to the electronic switch for another valve in the ring throughout the engaged interval to render the said other valve conductive if the channel comprising said other valve is not "engaged."

14. Apparatus according to claim 13, wherein the flip-flop circuit associated with one channel is arranged to apply to the electronic switch associated with said channel a pulse lasting for the duration of the engaged interval to operate said electronic switch.

15. Apparatus according to claim 14, wherein the means for registering each time a channel is rendered operative after an engaged interval comprises a uniselector switch connected to the flip-flop circuit and arranged to be stepped-on by one contact each time the flip-flop circuit emits a pulse at the end of an engaged interval.

16. Apparatus according to claim 15, wherein the electronic switch is arranged so that signals applied by the flip-flop circuit do not cause signals to be transmitted from the switch but only permit the switch to pass the selective impulses.

17. Apparatus according to claim 16, in which a pulse is transmitted through the uniselector to one of a multiplicity of simple pulse counters whenever a pulse from the flip-flop steps on the uniselector and in which one counter is provided to count the total number of elements within a selected size range.

18. Apparatus according to claim 17, in which the operation of the simple pulse counters is achieved by connection in a balanced circuit receiving signals both from the flip-flop through the uniselector and directly from the scanning means or an amplifier associated with said scanning means so that operation of the counter ensues only when the signal from the flip-flop is not balanced by a signal from the scanning means.

19. Apparatus according to claim 18, in which the counters advance the total count by one unit only when a pulse is received through the uniselector which is not accompanied by a pulse directly generated by the scanning means so that the unaccompanied pulse indicates the complete registration of a relatively large element.

References Cited in the file of this patent
UNITED STATES PATENTS

| | | |
|---|---|---|
| 2,037,044 | Reinartz et al. | Apr. 14, 1936 |
| 2,333,791 | Hutchison | Nov. 9, 1943 |
| 2,360,883 | Metcalf | Oct. 24, 1944 |
| 2,369,577 | Kielland | Feb. 13, 1945 |
| 2,472,542 | Moerman | June 7, 1949 |
| 2,494,441 | Hillier | Jan. 10, 1950 |
| 2,584,052 | Sandorff et al. | Jan. 29, 1952 |

OTHER REFERENCES

Popular Science, page 170, May 1949.